(12) United States Patent
Yamada et al.

(10) Patent No.: US 9,418,276 B2
(45) Date of Patent: Aug. 16, 2016

(54) FINGERPRINT AUTHENTICATION METHOD AND FINGERPRINT AUTHENTICATION DEVICE

(71) Applicant: FUJITSU LIMITED, Kawasaki-shi, Kanagawa (JP)

(72) Inventors: Shigefumi Yamada, Sagamihara (JP); Yukihiro Abiko, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/310,461

(22) Filed: Jun. 20, 2014

(65) Prior Publication Data
US 2014/0301615 A1    Oct. 9, 2014

Related U.S. Application Data

(63) Continuation of application No. PCT/JP2011/080523, filed on Dec. 28, 2011.

(51) Int. Cl.
*G06K 9/00* (2006.01)
*G06K 9/46* (2006.01)
*G06K 9/62* (2006.01)

(52) U.S. Cl.
CPC ............. *G06K 9/0008* (2013.01); *G06K 9/001* (2013.01); *G06K 9/00073* (2013.01)

(58) Field of Classification Search
USPC ......................................... 382/125, 195, 209
See application file for complete search history.

(56) References Cited

U.S. PATENT DOCUMENTS

| 5,659,626 | A  | * | 8/1997  | Ort ..................... | G06K 9/00067 |
|           |    |   |         |                          | 382/125      |
| 5,901,239 | A  |   | 5/1999  | Kamei                    |              |
| 6,002,784 | A  | * | 12/1999 | Sato ................... | G06K 9/00067 |
|           |    |   |         |                          | 382/124      |
| 6,799,275 | B1 | * | 9/2004  | Bjorn .................. | G06F 21/32   |
|           |    |   |         |                          | 283/67       |
| 7,327,859 | B1 | * | 2/2008  | Chau .................. | G06K 9/00046 |
|           |    |   |         |                          | 382/116      |
| 7,986,820 | B2 | * | 7/2011  | Moghaddam ...... | G06K 9/00087 |
|           |    |   |         |                          | 356/71       |
| 2002/0048390 | A1 |  | 4/2002  | Ikegami                  |              |

(Continued)

FOREIGN PATENT DOCUMENTS

| JP | 3-260778 | 11/1991 |
| JP | 9-044666 | 2/1997 |

(Continued)

OTHER PUBLICATIONS

Kaoru Uchida et al., "Fingerprint Card Classification for Identification with a Large-Size Database", The Institute of Electronics, Information and Communication Engineers (IEICE) Technical Report, vol. 95, No. 470, Feb. 19, 1999, (pp. 25-32) English Abstract.

(Continued)

*Primary Examiner* — Kathleen Y Dulaney
(74) *Attorney, Agent, or Firm* — Fujitsu Patent Center

(57) ABSTRACT

A client terminal acquires an image that includes at least a part of a fingerprint, and detects an orientation of a ridge that forms the fingerprint from the image, and detects a singular point of the fingerprint from the image, and calculates an angle formed, on a circumference of a reference circle whose center is the singular point, by the orientation of the ridge and the direction of a tangent line that comes into contact with the reference circle, and creates narrow down data that is used to narrow down matching data that is used to match the fingerprint by associating the angle with a position on the circumference of the reference circle.

10 Claims, 12 Drawing Sheets

(56) References Cited

U.S. PATENT DOCUMENTS

| | | | | |
|---|---|---|---|---|
| 2002/0061125 A1* | 5/2002 | Fujii | .................. | G06K 9/00067 382/125 |
| 2003/0091218 A1* | 5/2003 | Hamid | ............... | G06K 9/00067 382/124 |
| 2005/0084143 A1* | 4/2005 | Kramer | ................ | G06K 9/4642 382/125 |
| 2008/0144894 A1* | 6/2008 | Bichigov | ........... | G06K 9/00067 382/125 |

FOREIGN PATENT DOCUMENTS

| | | |
|---|---|---|
| JP | 9-114978 | 5/1997 |
| JP | 2002-109543 | 4/2002 |
| JP | 2002-133416 | 5/2002 |
| JP | 2006-244365 | 9/2006 |

OTHER PUBLICATIONS

Shinichiro Ito et al., "An Algorithm for Classification of Fingerprints Based on the Core", The Transactions of the Institute of Electronics, Information and Communication Engineers, vol. J73-D-II, No. 10 (pp. 1733-1741) Jul. 31, 1998.

International Search Report, mailed in connection with PCT/JP2011/080523 and mailed Jan. 31, 2012.

Partial English translation of "Kaoru Uchida et al., "Fingerprint Card Classification for Identification with a Large-Size Database", The Institute of Electronics, Information and Communication Engineers (IEICE) Technical Report, vol. 95, No. 470, Feb. 19, 1999, (pp. 25-32) English Abstract.", 3 pages.

Partial English Translation of "Shinichiro Ito et al., "An Algorithm for Classification of Fingerprints Based on the Core", The Transactions of the Institute of Electronics, Information and Communication Engineers, vol. J73-D-II, No. 10 (pp. 1733-1741) Jul. 31, 1998.", 3 pages.

* cited by examiner

FINGERPRINT AUTHENTICATION METHOD AND FINGERPRINT AUTHENTICATION DEVICE

CROSS-REFERENCE TO RELATED APPLICATION

This application is a continuation of International Application No. PCT/JP2011/080523, filed on Dec. 28, 2011, the entire contents of which are incorporated herein by reference.

FIELD

The embodiments discussed herein are related to a narrow down data creating method and a narrow down data creating device.

BACKGROUND

As one of authentication methods used in a biometric authentication technology, there is known "one-to-N authentication" in which authentication is performed by matching biometric information input by a user against biometric information on N persons registered in advance. When one-to-N authentication is used, because the biometric information input by a user is matched against biometric information on N persons registered in advance, it takes a long time to output the authentication result as the number of registered persons N related to the biometric information is increased. An example of a technology in use that reduces a time taken to perform authentication includes a narrow down technology that classifies registration data and that selects, as target data for the matching, registration data that belongs to the same classification as that of the input data when matching the registration data.

Patent Document 1: Japanese Laid-open Patent Publication No. 03-260778
Patent Document 2: Japanese Laid-open Patent Publication No. 2006-244365

However, with the related technology described above, there is a problem in that the accuracy of narrow down data is unstable as described below.

Namely, the quality of the biometric information that is acquired when registration and authentication is performed may vary depending on a method of inputting a portion used for the authentication and, furthermore, depending on an external factor, such as a stain attached to the portion used for the authentication or a stain attached to a reading device. Accordingly, even if biometric information on the same person is classified, the biometric information that is acquired at the time of authentication is not always classified into the same classification as that of the biometric information that is acquired at the time of registration. As described above, if the biometric information on the same person is classified into a different classification, because the target biometric information is not narrowed down to the biometric information that is used for the matching, the same person may possibly and erroneously be determined to be a different person.

SUMMARY

According to an aspect of an embodiment, a narrow down data creating method includes: acquiring, using a processor, an image that includes at least a part of a fingerprint; first detecting, using the processor, an orientation of a ridge that forms the fingerprint from the image; second detecting, using the processor, a singular point of the fingerprint from the image; calculating, using the processor, an angle formed, on a circumference of a reference circle whose center is the singular point, by the orientation of the ridge and the direction of a tangent line that comes into contact with the reference circle; and creating, using the processor, narrow down data that is used to narrow down matching data that is used to match the fingerprint by associating the angle with a position on the circumference of the reference circle.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. The present invention is not limited to these embodiments. Furthermore, the embodiments can be appropriately used in combination as long as the processes do not conflict with each other.

[a] First Embodiment

System Configuration

Figure 1:
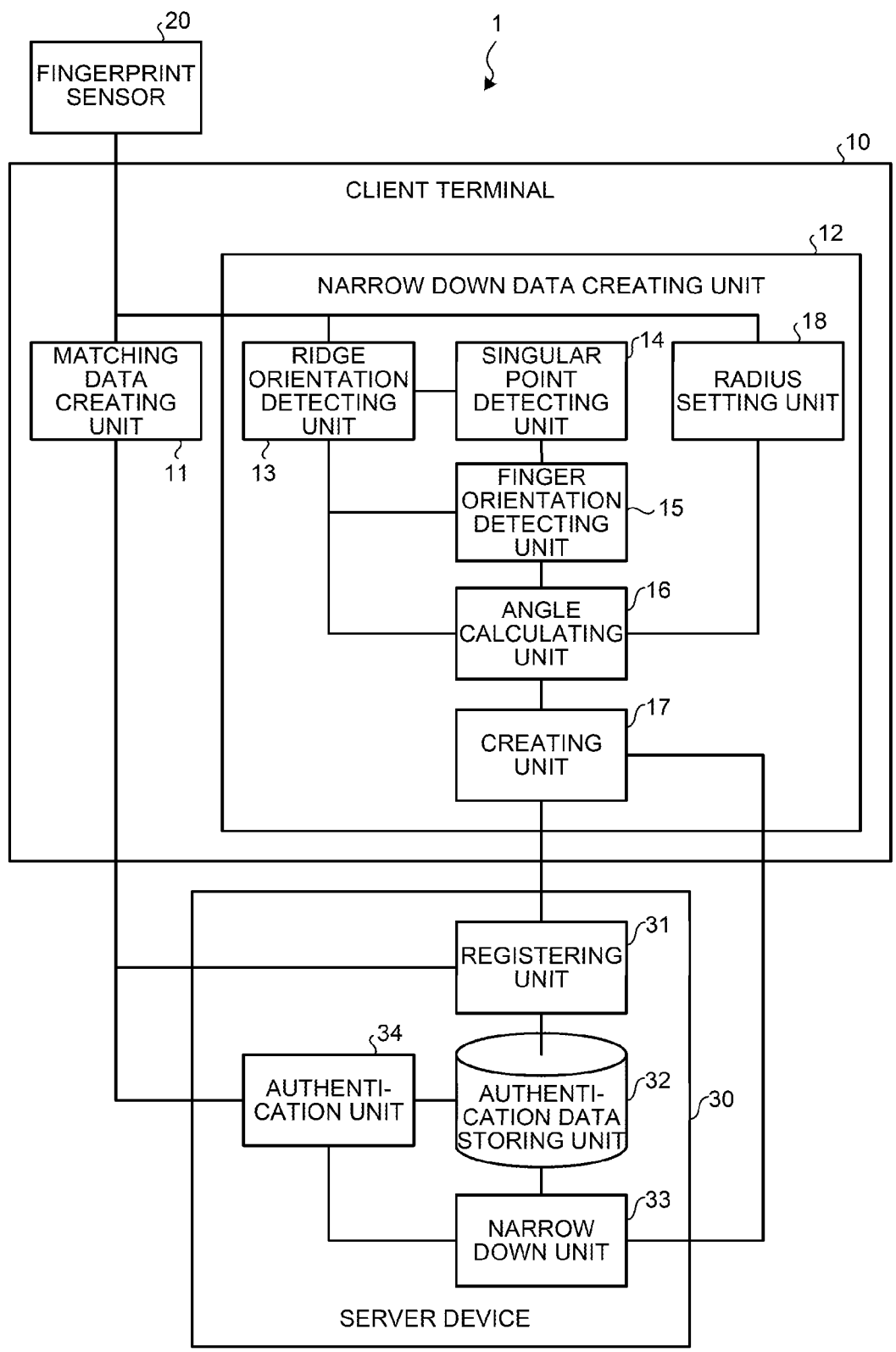
FIG. 1 is a block diagram illustrating the functional configuration of devices included in a biometric authentication system according to a first embodiment.

In the following, the configuration of a biometric authentication system according to the first embodiment will be described. FIG. 1 is a block diagram illustrating the functional configuration of devices included in a biometric authentication system according to a first embodiment. A biometric authentication system 1 illustrated in FIG. 1 narrows down matching data that is used, when 1-to-N fingerprint authentication is performed by using a fingerprint image obtained via a fingerprint sensor 20, for the matching performed by a server device 30 by using narrow down data that is created by a client terminal 10. In the example illustrated in FIG. 1, a description will be given with the assumption that fingerprint authentication is performed as login authentication that is performed when a user logs in to the client terminal 10.

As illustrated in FIG. 1, the biometric authentication system 1 accommodates therein the fingerprint sensor 20, the client terminal 10, and the server device 30. Of these devices, the client terminal 10 and the server device 30 are connected via a network such that they can communicate with each other. An example of the network includes a communication network, such as the Internet, a local area network (LAN), a virtual private network (VPN), or the like.

Furthermore, FIG. 1 illustrates an example of the single client terminal 10 and the single server device 30; however, the configuration of the disclosed system is not limited thereto. Specifically, the biometric authentication system 1 may also accommodate therein an arbitrary number of the client terminals 10 as long as the biometric authentication system 1 accommodates therein at least the single server device 30.

The fingerprint sensor 20 is a sensor that reads a fingerprint. The fingerprint sensor 20 used in this example may be any type, such as a capacitance type sensor, an electric field sensor, an optical sensor, a thermal sensor, a pressure sensor, or the like. Furthermore, a reading method used for the fingerprint sensor 20 may be a sliding type that slides a ball of a finger, i.e., the center portion of the inner side of a fingertip, or a stamp type that places a ball of a finger. Alternatively, instead of these contact type sensors, a non-contact type sensor may also be used. In this example, a description has been given of a case in which the fingerprint sensor 20 is connected to the client terminal 10 via, for example, a universal serial bus (USB); however, the fingerprint sensor 20 may also be installed in the client terminal 10.

The client terminal 10 is an information processing apparatus used by a user. An example of the client terminal 10 includes a fixed terminal, such as a personal computer (PC). In addition to this, it may also be possible to use a mobile terminal, such as a mobile phone, a personal handy-phone system (PHS), a personal digital assistant (PDA), a smart phone, or the like.

When a user logs in to the client terminal 10, the client terminal 10 receives, instead of an account and a password, an input of a user's fingerprint image. The client terminal 10 permits or prohibits the user from logging in to the client terminal 10 in accordance with the result of the fingerprint authentication performed by the server device 30, which will be described later.

Specifically, the client terminal 10 creates, from an image that is obtained from a fingerprint read by the fingerprint sensor 20, matching data that is used when the matching of the fingerprint is performed by the server device 30, which will be described later. In the following, an image that is obtained from a fingerprint read by the fingerprint sensor 20 may sometimes be referred to as a "fingerprint image". Furthermore, in the following, matching data created from a fingerprint image may sometimes be referred to as an "input matching data" and matching data registered in the server device 30, which will be described later, in advance may sometimes be referred to as "registration matching data".

Furthermore, the client terminal 10 creates, from the fingerprint image read by the fingerprint sensor 20, narrow down data that is used when the server device 30, which will be described later, narrows down registration matching data that is matched against input matching data. In the following, narrow down data created from a fingerprint image may sometimes be referred to as an "input narrow down data". Furthermore, narrow down data that is registered, in advance, in the server device 30, which will be described later, and that is associated with registration matching data may sometimes be referred to as "registration narrow down data".

Then, the client terminal 10 sends the matching data and the narrow down data created from the fingerprint image to the server device 30, which will be described later. As described above, the reason for the client terminal 10 outputting, instead of the fingerprint image itself, the matching data and the narrow down data created from the fingerprint image to the network is because user's personal information, i.e., a user's fingerprint, is prevented from leaking outside. In this example, a description will be given of a case in which the client terminal 10 creates matching data and narrow down data from a fingerprint image. However, the client terminal 10 may also transfer a fingerprint image without processing anything to the server device 30 and may allow the server device 30 to create matching data and narrow down data.

Then, if the result of authentication performed by the server device 30, which will be described later, has been successful, the client terminal 10 permits a user to log in to the client terminal 10. Specifically, the client terminal 10 allows a user to log in to the client terminal 10 by automatically inputting an account and a password. Consequently, the security of authentication of a user is further improved when compared with a case of performing password authentication, and furthermore, it is possible to reduce the risk of forgetfulness or leakage of a password.

In contrast, if the result of authentication performed by the server device 30, which will be described later, has been failed, the client terminal 10 prohibits a user from logging in to the client terminal 10. In such a case, the client terminal 10 may also output an alarm to prompt a user to input the fingerprint image again, may also output a warning indicating that the user does not have authorization to use the client terminal 10, and may also lock the operation performed on the client terminal 10.

The server device 30 is a computer that provides a fingerprint authentication service. When input narrow down data and input matching data are received from the client terminal 10, the server device 30 extracts registration matching data that is associated with registration narrow down data that is similar to the input narrow down data. Thus, the server device 30 narrows down the registration matching data that is to be matched against the input matching data. For example, the server device 30 narrows down registration matching data associated with registration narrow down data in which the narrow down similarity calculated from the input narrow down data and the registration narrow down data is within a predetermined ratio with respect to the total number N of registration matching data, e.g., within the top 10 of the total number N (=N/10). For another example, the server device 30 narrows down registration matching data associated with registration narrow down data in which the narrow down similarity calculated from the input narrow down data and the registration narrow down data is equal to or greater than a predetermined threshold.

Then, the server device 30 performs authentication by matching the input matching data against the registration matching data that is obtained from the narrow down result. For example, the server device 30 repeats a process that determines whether a matching score calculated from the input matching data and the registration matching data is equal to or greater than a predetermined threshold until the input matching data is matched against all pieces of the registration matching data that are previously narrowed down. At this point, if the matching score obtained from the input matching data and at least a piece of registration matching data is equal to or greater than a threshold, the server device 30 responds to the client terminal 10 indicating that the authentication of the input matching data has been successful. In contrast, if all matching score obtained from the input matching data and all pieces of the registration matching data is less than a threshold, the server device 30 responds to the client terminal 10 indicating that the authentication of the input matching data has failed.

Configuration of the Client Terminal 10

In the following, the functional configuration of the client terminal according to the first embodiment will be described. As illustrated in FIG. 1, the client terminal 10 includes a matching data creating unit 11 and a narrow down data creating unit 12. It is assumed that, in addition to the functioning units illustrated in FIG. 1, the client terminal 10 includes various functioning units, such as various input devices or audio output devices, included in a known personal computer.

The matching data creating unit 11 is a processing unit that creates, from a fingerprint image read by the fingerprint sensor 20, matching data that is used for fingerprint authentication. For example, the matching data creating unit 11 creates matching data from a fingerprint image in accordance with an arbitrary matching method, such as a minutiae method, a pattern matching method, a frequency analyzing method, or the like, that is used by an authentication unit 34 in the server device 30, which will be described later.

For example, if a minutiae method is used by the authentication unit 34, which will be described later, the matching data creating unit 11 creates, as matching data, the orientation of a feature point, such as an end point or a branch point of a ridge included in a fingerprint image pattern, and the correlation between a positional relationship and feature points. Furthermore, if a pattern matching is used by the authentication unit 34, which will be described later, the matching data creating unit 11 creates, as matching data, an image obtained by a fingerprint image subjected to binarization or thinning. Furthermore, if the frequency analyzing method is used by the authentication unit 34, which will be described later, the matching data creating unit 11 creates, as matching data, waveform spectrum series in which the cross section that is obtained by slicing a fingerprint image pattern is recognized as a waveform.

Then, the matching data creating unit 11 sends, to the server device 30, the matching data created by using the method described above. At this point, if a registration mode in which matching data and narrow down data are registered is set by a user or a system administrator of the client terminal 10, the matching data creating unit 11 sends, as registration matching data, the created matching data to a registering unit 31 in the server device 30. In contrast, if the registration mode is not set, the matching data creating unit 11 sends, as input matching data, the created matching data to a narrow down unit 33 in the server device 30.

The narrow down data creating unit 12 is a processing unit that creates, from a fingerprint image, narrow down data that is used to narrow down registration matching data. As illustrated in FIG. 1, the narrow down data creating unit 12 includes a ridge orientation detecting unit 13, a singular point detecting unit 14, a finger orientation detecting unit 15, an angle calculating unit 16, a creating unit 17, and a radius setting unit 18.

From among these units, the ridge orientation detecting unit 13 is a processing unit that detects the orientation of a ridge from a fingerprint image that is input by the fingerprint sensor 20. For example, by using a threshold that can be used separate a fingerprint image into the ridge, in which an opening of a sweat gland rises, and a valley line that is formed between the ridges, the ridge orientation detecting unit 13 binarizes the fingerprint image and then divides the binalized fingerprint image into blocks with a predetermined size. At this point, the size of the block used in this case is the size in which multiple ridges that forms a fingerprint of an adult male are included. For example, the ridge orientation detecting unit 13 divides a fingerprint image into blocks of 8×8 pixels. Then, by performing edge detection on the boundary line between a ridge and a valley line, the ridge orientation detecting unit 13 detects the orientation of a ridge for each block. At this point, the ridge orientation detecting unit 13 detects the orientation of the ridge by using an arbitrary orientation of an image as the reference, for example, by setting the vertical direction of an image to 0 degrees as the reference and by using a difference value from the reference.

The singular point detecting unit 14 is a processing unit that detects, from a fingerprint image input by the fingerprint sensor 20, a singular point of a pattern that forms a fingerprint. For example, when the singular point detecting unit 14 detects the "central fingerprint" as a singular point of the fingerprint, the singular point detecting unit 14 calculates a curvature of each ridge from the orientation of the ridge that has been detected by the ridge orientation detecting unit 13 for each block and then detects a point in which a curvature of a ridge becomes the maximum as the "central fingerprint". A known technology, such as the technology described in Japanese Laid-open Patent Publication No. 1-337808 may be used for a method of detecting the central fingerprint. In addition to the central fingerprint, the singular point detecting unit 14 detects a singular point of a fingerprint, such as a delta that is a point of meeting from three orientations of ridges or an end point of a ridge.

Figure 2:
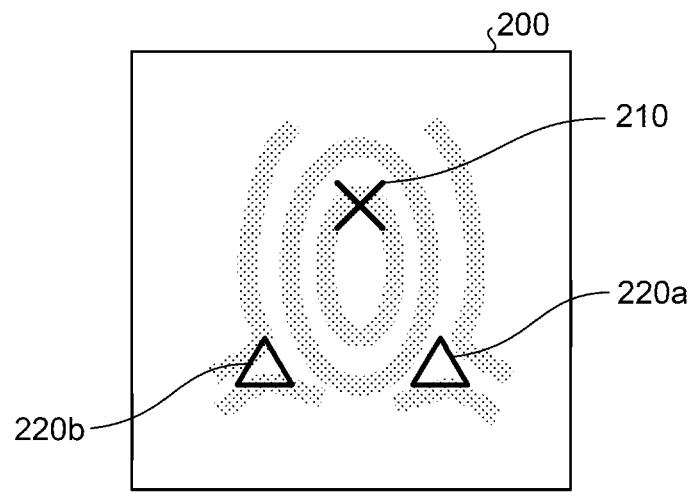
FIG. 2 is a schematic diagram illustrating an example of a detection result of a singular point of a Whorl type fingerprint.
Figure 3:
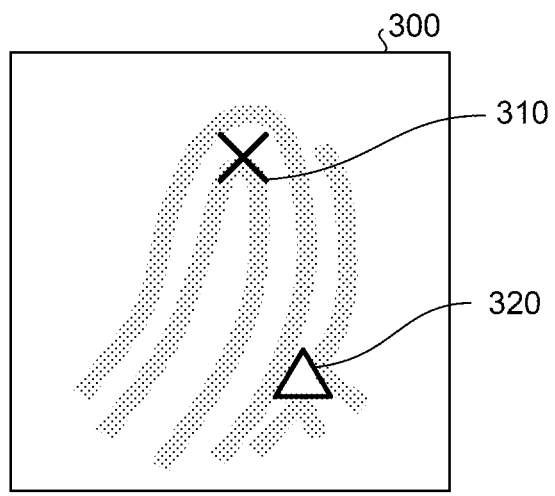
FIG. 3 is a schematic diagram illustrating an example of a detection result of a singular point of a left Loop type fingerprint.
Figure 4:
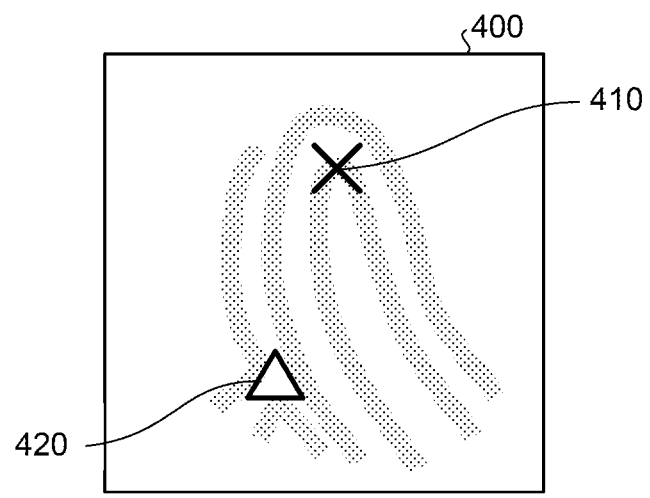
FIG. 4 is a schematic diagram illustrating an example of a detection result of a singular point of a right Loop type fingerprint.
Figure 5:
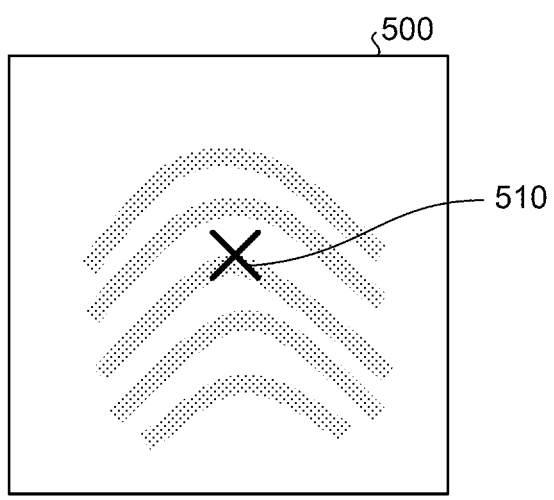
FIG. 5 is a schematic diagram illustrating an example of a detection result of a singular point of an Arch type fingerprint.

In the following, an example of the detection result of a singular point will be described with reference to FIGS. 2 to 5. FIG. 2 is a schematic diagram illustrating an example of a detection result of a singular point in a Whorl type fingerprint. FIG. 3 is a schematic diagram illustrating an example of a detection result of a singular point in a left Loop type fingerprint. FIG. 4 is a schematic diagram illustrating an example of a detection result of a singular point in a right Loop type fingerprint. FIG. 5 is a schematic diagram illustrating an example of a detection result of a singular point in an Arch type fingerprint. The triangles illustrated in FIGS. 2 to 5 indicate the delta of the fingerprint and the crosses illustrated in FIGS. 2 to 5 indicate the center of the fingerprint.

As illustrated in FIG. 2, in a Whorl type fingerprint image 200, a central fingerprint 210 is detected at the center of the concentric circles of the ellipses formed by whorl shaped ridges and deltas 220a and 220b are detected on both sides below the central fingerprint 210. As illustrated in FIG. 3, in a left Loop type fingerprint image 300, the lower portion of a central fingerprint 310 is not semi-elliptical but is formed such that the loop pattern is shifted to the left side. If the loop pattern is formed in this way by being shifted on the left side, a delta 320 is detected at the location on the lower right of the central fingerprint 310. As illustrated in FIG. 4, in a right Loop type fingerprint image 400, the lower portion of a central fingerprint 410 is not semi-elliptical but is formed, in contrast to the left Loop type fingerprint image 300, such that the loop pattern is shifted to the right side. If the loop pattern is formed in this way by being shifted on the right side, a delta 420 is detected at the location on the lower left side of the central fingerprint 410. As illustrated in FIG. 5, in an Arch type fingerprint image 500, the upper portion of a central fingerprint 510 is formed in a semi-elliptical shape but the lower portion of the central fingerprint 510 is formed such that the ridges are shifted to both sides, i.e., to the left and right sides. In such a case, a delta is not always detected. As described above, in any fingerprints, i.e., the Whorl type fingerprint, the left Loop type fingerprint, the right Loop type fingerprint, and the Arch type fingerprint, a unique feature distinctly tends to appear on the lower portion of a central fingerprint rather than the upper portion thereof.

The finger orientation detecting unit 15 is a processing unit that detects the orientation of a finger including a fingerprint. For example, the finger orientation detecting unit 15 detects the longitudinal direction from the central fingerprint toward the root of the finger by using the fingerprint pattern structure, i.e., by using the feature of a fingerprint that is an assembly of arc curves of the concentric circles of the ellipses. A known technology such as the technology described in, for example, Japanese Laid-open Patent Publication 2002-109543 may be used for a method of detecting the orientation of a finger. For example, the finger orientation detecting unit 15 detects a wrinkle of a first joint of a finger represented in a fingerprint image and then detects, as the "finger orientation", the normal line direction with respect to the first joint, e.g., from the central fingerprint to the first joint, such as the longitudinal direction toward the root of the finger. In this way, in addition to detecting the orientation of a finger by using a fingerprint image, the longitudinal direction of a finger may also be detected from the correlation between a fingerprint image and the shape of a guide of the fingerprint sensor 20 that guides a finger to place at the location in which a fingerprint image is acquired normally.

The angle calculating unit 16 is a processing unit that calculates an angle formed, on a circumference of a reference circle whose center is the singular point, by the orientation of the ridge and the direction of a tangent line that comes into contact with the reference circle.

For example, first, the angle calculating unit 16 sets the reference circle in which the position of the central fingerprint in a fingerprint image is defined as the central point and a predetermined length R from the central point is defined as the radius. At this point, the angle calculating unit 16 sets, as the reference circle, multiple concentric circles that share the central fingerprint as the central point and that have different radii. Then, the angle calculating unit 16 selects one of the multiple concentric circles as the reference circle and then selects a block that includes the circumference of the reference circle as the target for calculating an angle.

At this point, when selecting a block that is targeted for calculating an angle, the angle calculating unit 16 selects a single block from among blocks that are included in a lower area of the central fingerprint, which is set on the basis of the central fingerprint and the longitudinal direction of a finger, and that include the circumference of the reference circle with a predetermined length or more in a fingerprint image. For example, when a coordinate system is set in which the intersection of the line from the central fingerprint toward a finger in the longitudinal direction and the reference circle is defined as the origin and the counterclockwise direction of the circumference of the reference circle whose center is the origin is defined as "positive", an area between $-\pi/2$ and $\pi/2$ corresponds to the lower area of the central fingerprint. As described above, the reason for using the lower area of the central fingerprint as the target for calculating an angle is because a variety of fingerprint appears in the lower area of the central fingerprint in various type fingerprints, such as the Whorl type fingerprint, the left Loop type fingerprint, the right Loop type fingerprint, the Arch type fingerprint, or the like. Consequently, it is possible to eliminate the calculation of an angle in the upper area of the central fingerprint and efficiently reduce the time and an amount of computation related to create narrow down data.

Figure 6:
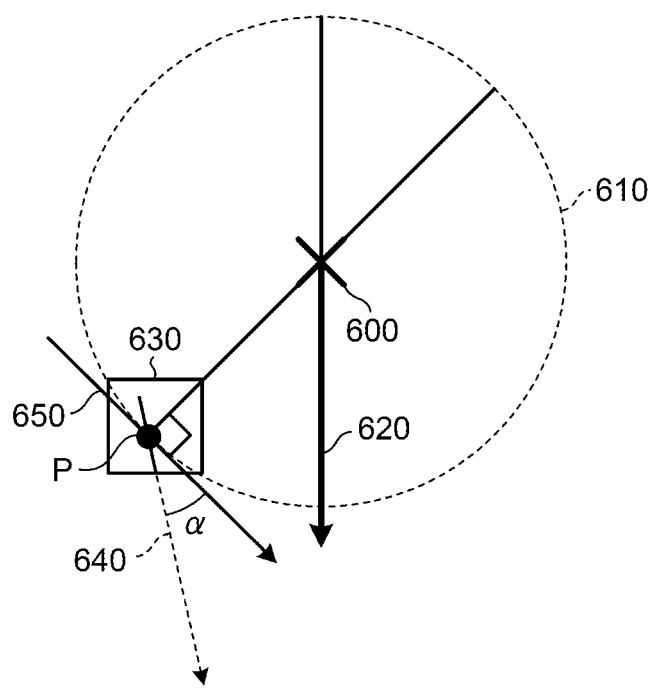
FIG. 6 is a schematic diagram illustrating an example of an angular difference between the orientation of a ridge and the direction of a tangent line.

Then, the angle calculating unit 16 calculates an angular difference between the orientation of a ridge and the direction of a tangent line of the reference circle by using, as the reference, the orientation of the finger detected by the finger orientation detecting unit 15. FIG. 6 is a schematic diagram illustrating an example of an angular difference between the orientation of a ridge and the direction of a tangent line. In the example illustrated in FIG. 6, it is assumed a case in which, from among singular points of the fingerprint, a reference circle 610 in which the position of a central fingerprint 600 is defined as the center is set in the fingerprint image. As illustrated in FIG. 6, the angle calculating unit 16 calculates an angle formed by a direction 620 of a finger detected by the finger orientation detecting unit 15 and an orientation 640 of a ridge in a block 630 that is selected first from among the orientation of ridges detected by the ridge orientation detecting unit 13. By doing so, the angle calculating unit 16 converts the orientation 640 of the ridge in the block 630 into an angle obtained by using, as a reference, the direction 620 of the finger, i.e., into a rotation angle of the orientation of the finger. Then, the angle calculating unit 16 obtains a direction 650 of the tangent line passing through an intersection P of the reference circle and a ridge that is obtained if it is assumed that the ridge in the block 630 intersects with the reference circle 610. As for the direction of a tangent line, the angle calculating unit 16 also calculates an angle obtained by using the direction 620 of a finger as a reference, i.e., a rotation angle of the orientation of the finger. Then, the angle calculating unit 16 calculates an angular difference $\alpha$ between the orientation 640 of the ridge and the direction 650 of the tangent line. Furthermore, in this example, it is assumed that an angular difference between the orientation of a ridge and the direction of the tangent line is calculated by using an absolute value; however, an angular difference may also be calculated by distinguishing positive and negative.

As described above, the angle calculating unit 16 repeatedly calculates an angular difference between the orientation of a ridge and the direction of the tangent line for all of the reference circles and the blocks.

The creating unit 17 is a processing unit that creates narrow down data that is used to narrow down registration matching data by associating the angle calculated by the angle calculating unit 16 with a position on the circumference of the reference circle. For example, the creating unit 17 associates an angular difference between the orientation of a ridge calculated for each block on the circumference of the reference circle and the direction of a tangent line. Consequently, narrow down data is created, in which an angular difference is associated, as an element, with each circumferential direction of the reference circle. At this point, when performing a narrow down process, in order to simplify a comparing process performed by using the narrow down data, extrapolation may also be performed such that the number of pieces of narrow down data becomes a predetermined number of elements. For example, by performing extrapolation on the angular difference calculated at predetermined angle intervals in the circumferential direction, the creating unit 17 may also create narrow down data such that the number of pieces of narrow down data becomes the number of elements M. Furthermore, if multiple reference circles are set, the creating unit 17 associates an angular difference for each position of the circumference of each reference. In such a case, narrow down data, for example, a zero-order reference circle $[s_{01}, s_{02}, s_{03}, \ldots, s_{0M}]^t$, a first-order reference circle $[s_{11}, s_{12}, s_{13}, \ldots, s_{1M}]^t$, ..., an N-th order reference circle $[s_{N1}, s_{N2}, s_{N3}, \ldots, s_{NM}]^t$ is obtained for each reference circle.

In the following, an example of narrow down data will be described with reference to FIGS. 7 to 14. FIGS. 7 to 10 are schematic diagrams each illustrating an example of the relationship between the orientation of a ridge and the direction of a tangent line in a Whorl type fingerprint, a left Loop type fingerprint, a right Loop type fingerprint, and an Arch type fingerprint. In the examples illustrated in FIGS. 7 to 10, it is assumed that two reference circles, i.e., a zero-order reference circle and a first-order reference circle. Each line in each block illustrated in FIGS. 7 to 10 indicates the orientation of a ridge. Furthermore, FIGS. 11 to 14 are schematic diagrams illustrating examples of the distributions of angular differences associated with the diagrams illustrated in FIGS. 7 to 10, respectively. The horizontal axis in the graph each illustrated in FIGS. 11 to 14 indicates the coordinate system in which the intersection of the line from the central fingerprint toward a finger in the longitudinal direction and the reference circle is defined as the origin and the counterclockwise direction of the circumference of the reference circle whose center is the origin is defined as "positive". Furthermore, the vertical axis indicates an angular difference between the orientation of a ridge and the direction of a tangent line. The graphs illustrated in FIGS. 11 to 14 indicate the distributions of angular differences related to a first-order reference circle that is located on an outer circumference between the two reference circles, i.e., a zero-order reference circle and the first-order reference circle.

In the examples illustrated in FIGS. 7 to 10, an angular difference between the orientation of the ridge in each of the blocks with the oblique lines in FIGS. 7 to 10 and the direction of a tangent line of a zero-order reference circle 700 is calculated by the angle calculating unit 16. Furthermore, an angular difference between the orientation of the ridge in each of the block with the dots in FIGS. 7 to 10 and the direction of a tangent line of a first-order reference circle 710 is calculated by the angle calculating unit 16.

Figure 7:
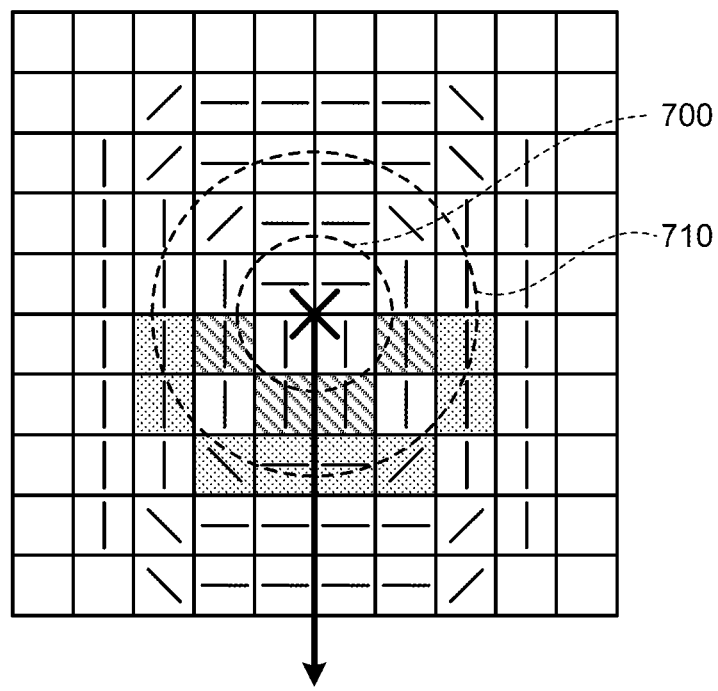
FIG. 7 is a schematic diagram illustrating the relationship between the orientation of a ridge and the direction of a tangent line in a Whorl type fingerprint.
Figure 11:
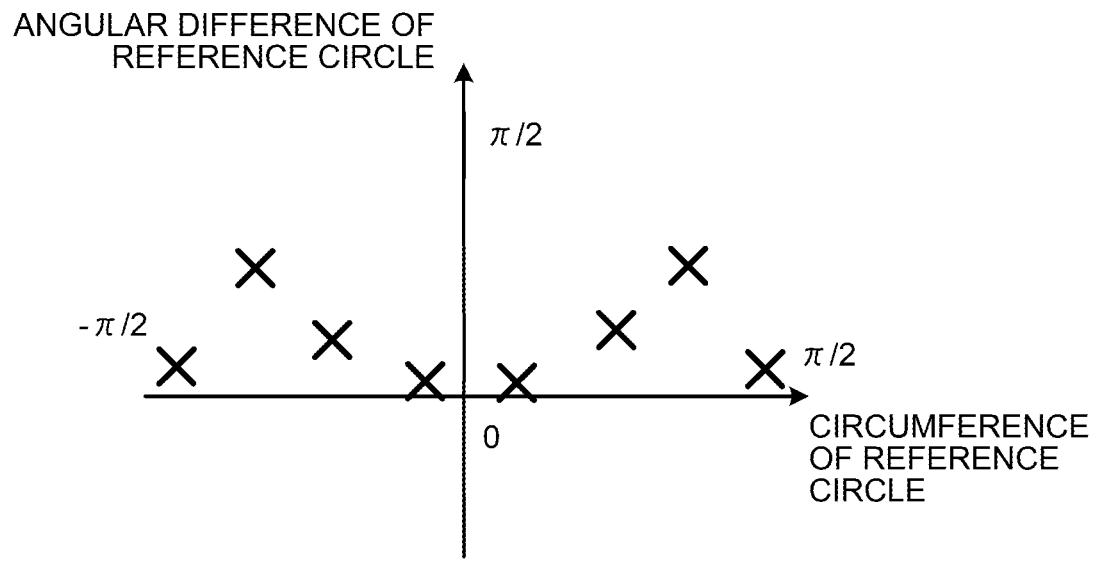
FIG. 11 is a schematic diagram illustrating an example of the distribution of angular differences associated with the diagram illustrated in FIG. 7.

As illustrated in FIG. 7, if a Whorl type fingerprint if used, a semi-elliptical pattern may sometimes be formed on the lower side of the central fingerprint. Consequently, if the circumference of a circle is $-\pi/2$ or $\pi/2$, because the shape thereof is substantially the same as the semi-circular shape that occupies the lower side of the first-order reference circle 710, as illustrated in FIG. 11, an angular difference is hardly calculated. In contrast, because a difference between the semi-elliptical ridge and the semi-circular reference circle is increased as the position of the circumference of the circle closer from $-\pi/2$ to $-\pi/4$ or closer from $\pi/2$ to $\pi/4$, the peak of the angular difference with about $\pi/4$ appears on each of the right side and the left side of the coordinate system.

Figure 8:
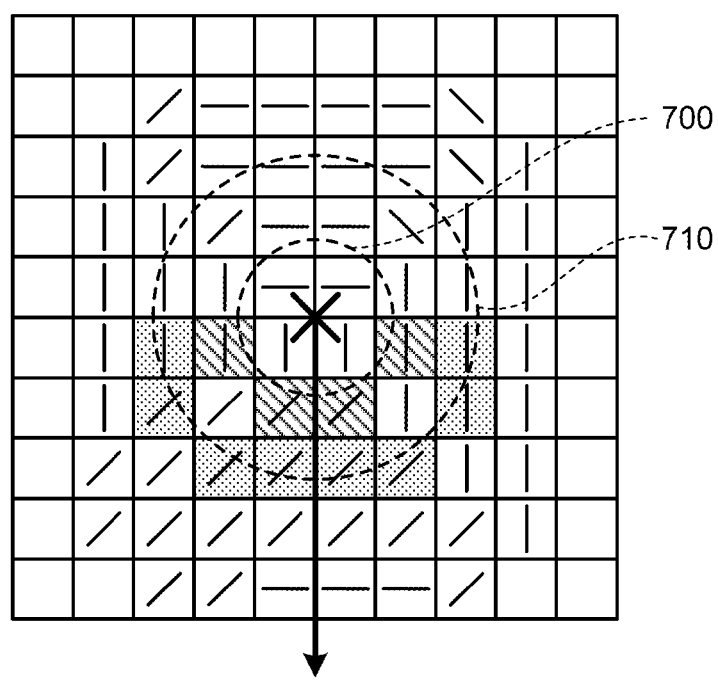
FIG. 8 is a schematic diagram illustrating the relationship between the orientation of a ridge and the direction of a tangent line in a left Loop type fingerprint.
Figure 9:
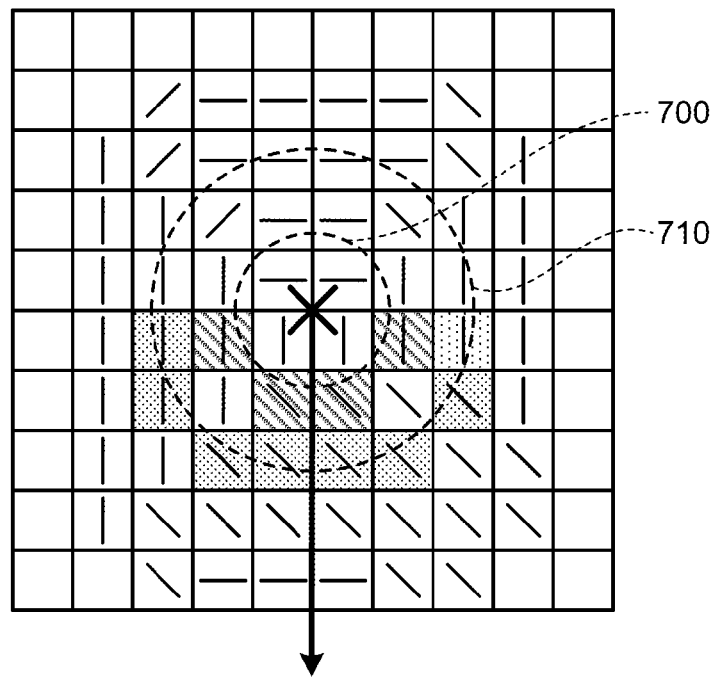
FIG. 9 is a schematic diagram illustrating the relationship between the orientation of a ridge and the direction of a tangent line in a right Loop type fingerprint.
Figure 10:
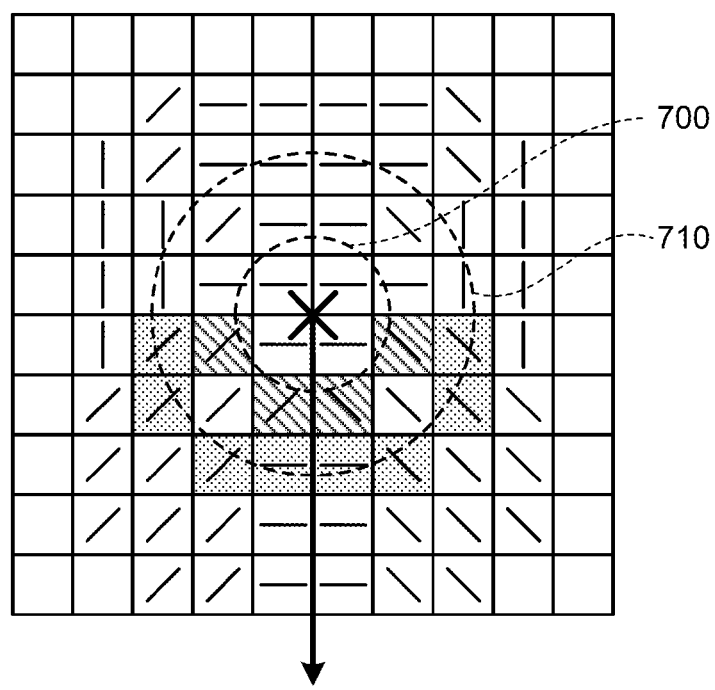
FIG. 10 is a schematic diagram illustrating the relationship between the orientation of a ridge and the direction of a tangent line in an Arch type fingerprint.
Figure 12:
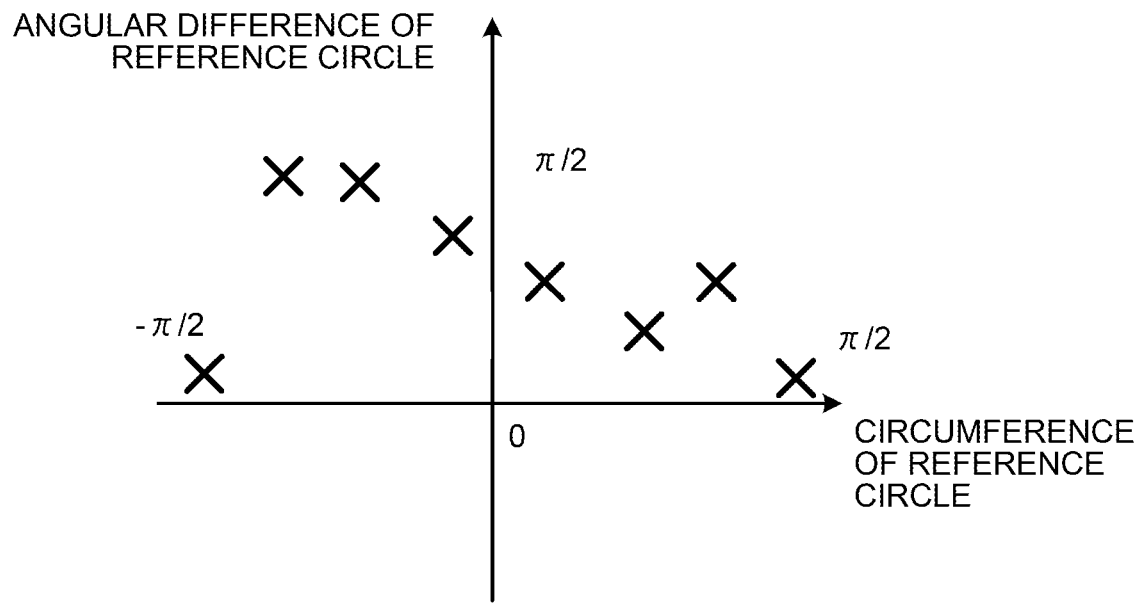
FIG. 12 is a schematic diagram illustrating an example of the distribution of angular differences associated with the diagram illustrated in FIG. 8.
Figure 13:
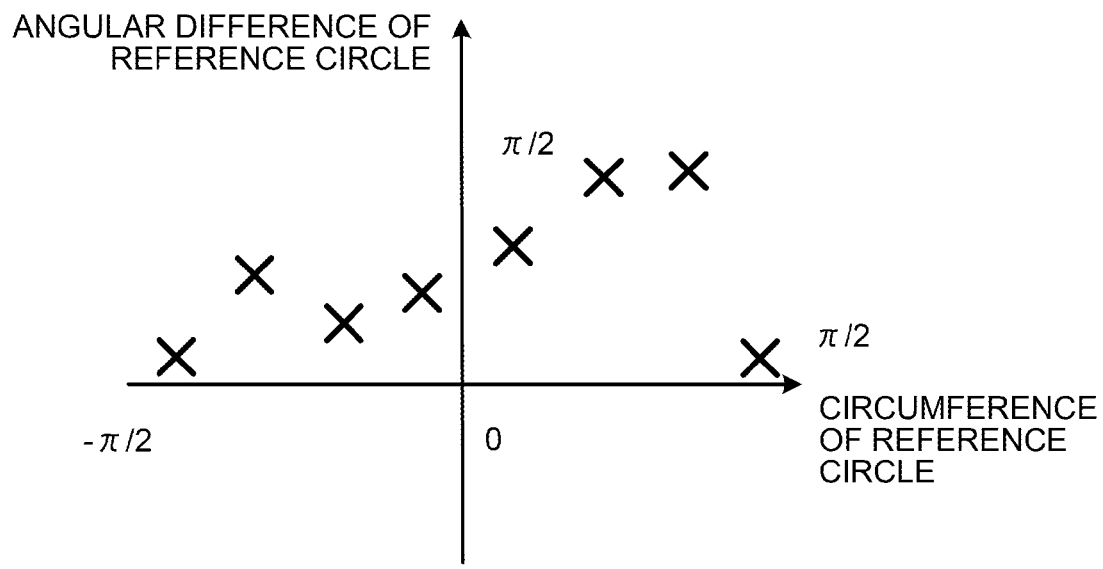
FIG. 13 is a schematic diagram illustrating an example of the distribution of angular differences associated with the diagram illustrated in FIG. 9.
Figure 14:
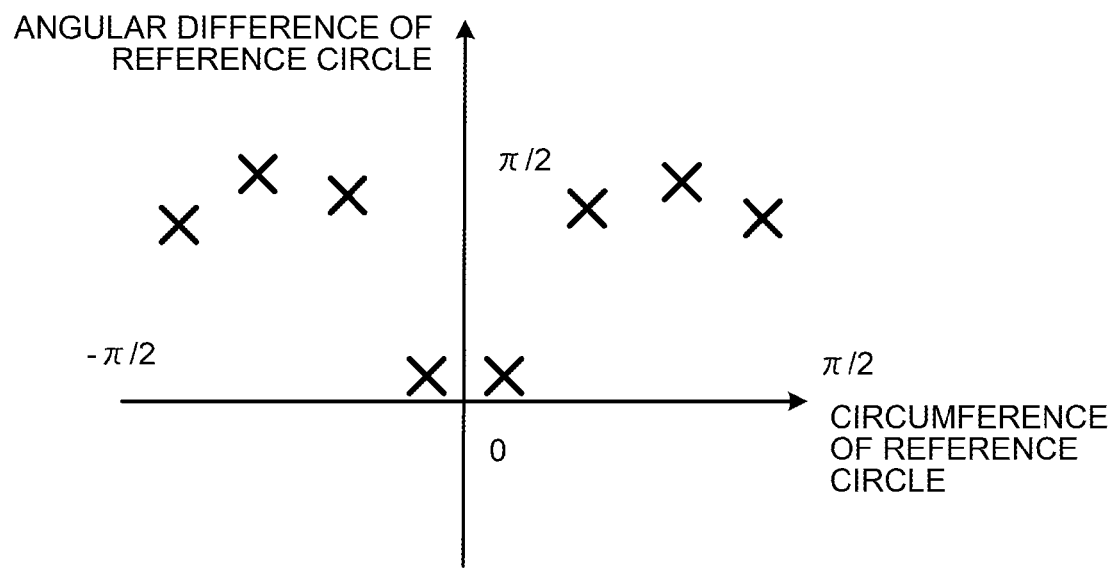
FIG. 14 is a schematic diagram illustrating an example of the distribution of angular differences associated with the diagram illustrated in FIG. 10.

As illustrated in FIG. 8, if a left Loop type fingerprint is used, in some cases, the pattern at the lower portion of the central fingerprint is not semi-elliptical shape but is formed such that the loop pattern is shifted to the left side. Consequently, as illustrated in FIG. 12, the peak of the angular difference with about $\pi/2$ appears on the left side of the coordinate system. Furthermore, if a right Loop type fingerprint is used, in some cases, that pattern at the lower portion of the central fingerprint is not semi-elliptical shape but is formed, in contrast to the left Loop type fingerprint, such that the loop pattern is shifted to the right side. Consequently, as illustrated in FIG. 13, the peak of the angular difference with about $\pi/2$ appears on the right side of the coordinate system. Furthermore, if an Arch type fingerprint is used, in some cases, the upper portion of the central fingerprint is formed in a semi-elliptical shape but the lower portion of the central fingerprint is formed such that the ridges are shifted to both sides. Consequently, in contrast to the Whorl type fingerprint, in most cases, the orientation of a ridge in an Arch type fingerprint significantly deviates, on most of the circumferences except for a portion near the origin, from the direction of the tangent line of the reference circle. Consequently, as illustrated in FIG. 14, the peak of the angular difference with about $\pi/2$ appears on each of the left side and the right side.

As described above, by associating the angular difference calculated for each block with the position of the circumference of a circle, it is possible to create the narrow down data having the feature for each type of fingerprint, such as a Whorl type fingerprint, a left Loop type fingerprint, a right Loop type fingerprint, an Arch type fingerprint, or the like. In this example, the data obtained by associating the angular difference with the position of the circumference of a circle is used as narrow down data; however, by labeling an angular difference for each position on the circumference of a circle indicating the angular difference belongs to which type illustrated in FIGS. 11 to 14, the labeled information may also be used as the narrow down data.

Thereafter, the creating unit 17 sends the narrow down data created in this way to the server device 30. At this point, if a registration mode is set, the creating unit 17 sends the created narrow down data as the registration narrow down data to the registering unit 31 in the server device 30. In contrast, if the registration mode is not set, the creating unit 17 sends, as input narrow down data, the created narrow down data to the narrow down unit 33 in the server device 30.

The radius setting unit 18 is a processing unit that sets the radius R of the reference circle that is set by the angle calculating unit 16. For example, the radius setting unit 18 converts the fingerprint image to a frequency component and then determines the radius R of the reference circle in accordance with the width of the ridge obtained from the frequency component and the intervals of the ridge. Furthermore, for the conversion to the frequency component, Fourier transformation, fast Fourier transformation (FFT), discrete cosine transformation (DCT), or the like may also be used.

For example, on the basis of the length or the interval of the ridge obtained from the frequency component, the radius setting unit 18 adjusts the length of a ridge corresponding to the length of the radius R of the reference circle, i.e., adjusts the length of the radius such that the radius includes four ridges and three valley lines that are arranged among the ridges. For another example, the radius setting unit 18 stores, in a memory or the like (not illustrated), the average value of the width or the interval of a ridge of an adult and a default value of the radius R. Then, the radius setting unit 18 sets the radius R such that, as the width or the interval of the ridge obtained from the frequency component is greater than the average value, the radius R is greater than the default value of the radius R associated with the average value. In this case, the length that corresponds to the length of four ridges of an adult is preferably set for the default value of the radius R.

The reason for setting the radius R of the reference circle in accordance with the width or the interval of a ridge is to create narrow down data coping with a change over the years. Specifically, even if the same fingerprint is used, the shape or the type is unchanged but the pattern of the fingerprint enlarges due to a growth. Accordingly, if the width or the interval of a ridge is small, the radius setting unit 18 makes the radius R of the reference circle small. In contrast, if the width or the interval of a ridge is large, the radius setting unit 18 makes the radius R of the reference circle large. Thus, this makes it possible to cope with a change of the same person's fingerprint over the years.

Various integrated circuits or electronic circuits may be used for the matching data creating unit 11 and the narrow down data creating unit 12. Furthermore, another integrated circuit or another electronic circuit may also be used for some of the functioning units included in the narrow down data creating unit 12. An example of the integrated circuit includes an application specific integrated circuit (ASIC). Furthermore, an example of the electronic circuit includes a central processing unit (CPU), a micro processing unit (MPU), or the like.

Configuration of the Server Device 30

In the following, the configuration of the server device 30 according to the first embodiment will be described. As illustrated in FIG. 1, the server device 30 includes the registering unit 31, an authentication data storing unit 32, the narrow down unit 33, and the authentication unit 34. Furthermore, in addition to the functioning units illustrated in FIG. 1, it is assumed that the server device 30 includes various functioning units, such as various input devices or audio output devices, included in a known computer.

From among these units, the registering unit 31 is a processing unit that registers, when authentication data that includes registration matching data and registration narrow down data is received from the client terminal 10, the authentication data in the authentication data storing unit 32.

The authentication data storing unit 32 is a storing unit that stores therein, the authentication data in which matching data is associated with narrow down data. For example, in order to narrow down registration matching data that is used to match against the input matching data, the narrow down unit 33, which will be described later, refers to registration narrow down data stored in the authentication data storing unit 32. For another example, in order to match input matching data, the authentication unit 34, which will be described later, refers to registration matching data stored in the authentication data storing unit 32.

The "matching data" mentioned here is registration matching data that is stored in the server device 30 in advance and that is suitable for an arbitrary authentication method, such as a minutiae method, a pattern matching method, or a frequency analyzing method, which are used by the authentication unit 34, which will be described later. Furthermore, the "narrow down data" mentioned here is registration narrow down data that is stored in the server device 30 in advance and that is associated with an angular difference for each position of the circumference of the reference circle.

An example of the authentication data storing unit 32 includes a semiconductor memory device or a storage device. Furthermore, an example of the semiconductor memory device includes a video random access memory (VRAM), a random access memory (RAM), a flash memory, or the like. Furthermore, an example of the storage device includes a storage device, such as a hard disk, an optical disk, or the like.

The narrow down unit 33 is a processing unit that narrows down registration matching data that is used to match the data against input matching data from among the pieces of registration matching data stored in the authentication data storing unit 32. For example, the narrow down unit 33 starts a process when authentication data that includes input matching data and input narrow down data is received from the client terminal 10. Specifically, the narrow down unit 33 reads, from the authentication data storing unit 32, the registration narrow down data that is associated with registration matching data. Then, the narrow down unit 33 calculates the narrow down similarity between the registration narrow down data that has been read from the authentication data storing unit 32 and the input narrow down data that is received from the client terminal 10. At this point, if multiple reference circles are set, the narrow down unit 33 calculates the narrow down similarity between the input narrow down data and the registration narrow down data for each order of the reference circle. Furthermore, the narrow down similarity described above may be calculated by treating the narrow down data as vector data and by calculating the distance, such as the Euclidean distance the city block distance between input narrow down data and registration narrow down data.

At this point, the narrow down unit 33 performs the weighting on the narrow down similarity that is calculated for each order of the reference circle and then calculates comprehensive narrow down similarity in which the narrow down similarity in each order of the reference circle are updated. For example, if the narrow down similarity of the two orders, i.e., the zero-order reference circle and the first-order reference circle, the narrow down unit 33 sets the weighting of the first-order reference circle, whose radius is greater than that of the zero-order reference circle, a value greater than the weighting of the zero-order reference circle and then performs an averaging process, such as weighted average, on the narrow down similarity of each order of the reference circle. In this way, by increasing the value of the weighting of the first-order reference circle that is present outside the zero-order reference circle and in which the number of samples of angular differences is greater than that of the zero-order reference circle, further global and comprehensive similarity can be calculated. Furthermore, in this example, a description has been given of a case in which narrow down similarity is calculated every two orders. If narrow down similarity is calculated for every three or more orders, the weighting of narrow down similarity for each order may be set such that the weighting of the subsequent order becomes greater as the radius of the reference circle is increased.

Thereafter, when the narrow down unit 33 calculates the narrow down similarity between all pieces of the registration narrow down data, the narrow down unit 33 sorts the comprehensive narrow down similarity in descending order and then narrows down the registration matching data that is associated with the registration narrow down data within a predetermined ratio with respect to the total number N of registration matching data, e.g., within the top 10 of the total number N of registration matching data. In this example, a description has been given of a case in which the registration matching data is narrowed down to a predetermined number; however, it may also possible to narrow down all pieces of the registration matching data associated with the registration narrow down data in which the comprehensive narrow down similarity is equal to or greater than a predetermined threshold.

Furthermore, a description has been given of a case in which the narrow down unit 33 sets the weighting of the first-order reference circle, whose radius is greater than that of the zero-order reference circle, a value greater than the weighting of the zero-order reference circle; however, it may possible to set the weighting of the zero-order reference circle, whose radius is smaller than that of the first-order reference circle, a value greater than the weighting of the first-order reference circle. In this way, by increasing the value of the weighting of the zero-order reference circle that is present inside the first-order reference circle and in which the number of samples of angular differences located near the central fingerprint, it is possible to calculate further robust and comprehensive similarity in terms of an input of a fingerprint.

The authentication unit 34 is a processing unit that matches the input matching data against the registration matching data that has been narrowed down by the narrow down unit 33 and that performs authentication. For example, by matching the input matching data against the registration matching data that has been narrowed down by the narrow down unit 33, the authentication unit 34 calculates a matching score in which the probability of the same person is increased as a value is increased. Then, the authentication unit 34 determines whether the maximum matching score out of the previously calculated matching scores is equal to or greater than a predetermined threshold. At this point, if the maximum matching score is equal to or greater than the threshold, the authentication unit 34 determines that the fingerprint authentication has been successful between the registration matching data with the maximum matching score and the input matching data. Furthermore, if the maximum matching score is less than the threshold, the authentication unit 34 determines that the authentication of the input matching data has failed. Then, the authentication unit 34 sends the authentication result to the client terminal 10. Furthermore, the authentication unit 34 may use an arbitrary authentication method, such as the minutiae method, the pattern matching method, a frequency analyzing method, or the like.

Furthermore, various integrated circuits or electronic circuits may be used for the registering unit 31, the narrow down unit 33, and the authentication unit 34. An example of the integrated circuit includes an ASIC. Furthermore, an example of the electronic circuit includes a CPU, an MPU, or the like.

Flow of a Process

In the following, the flow of a process performed by each of the devices in the biometric authentication system according to the first embodiment will be described. The flow of the processes will be described in the following order: (1) login process that is performed by the client terminal 10, (2) narrow down data creating process that is performed as the subroutine of the login process, (3) biometric authentication process the is performed by the server device 30, and (4) narrow down process that is performed as the subroutine of the biometric authentication process.

(1) Login Process

Figure 15:
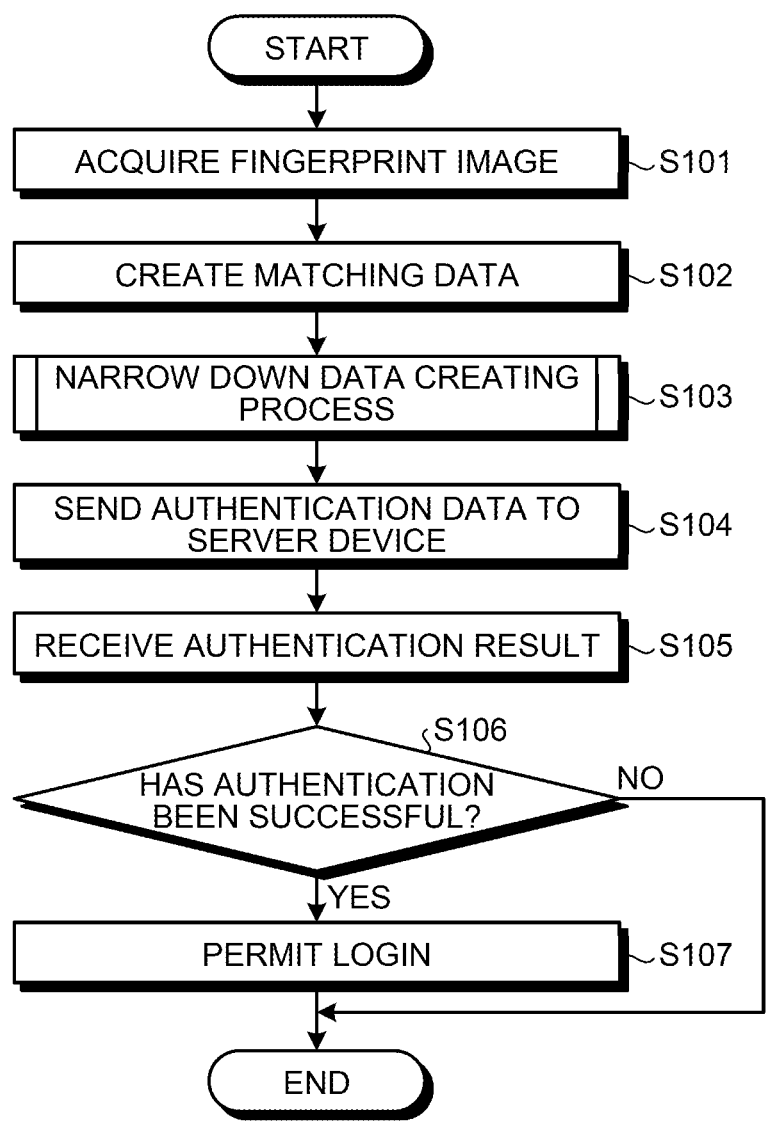
FIG. 15 is a flowchart illustrating the flow of a login process according to the first embodiment.

FIG. 15 is a flowchart illustrating the flow of a login process according to the first embodiment. This login process is started when the fingerprint sensor 20 reads a fingerprint image in a state in which the client terminal 10 is started.

As illustrated in FIG. 15, a fingerprint image is acquired from the fingerprint sensor 20 (Step S101), the client terminal 10 creates, from the fingerprint image, matching data that is used to perform fingerprint authentication (Step S102). Then, the client terminal 10 creates, from the fingerprint image, narrow down data that is used to narrow down registration matching data (Step S103).

Then, the client terminal 10 sends the input matching data and the input narrow down data to the server device 30 (Step S104). Thereafter, the client terminal 10 receives a reply of the authentication result from the server device 30 (Step S105).

At this point, if the result of authentication has been successful (Yes at Step S106), the client terminal 10 permits a user to log in to the client terminal 10 (Step S107) and ends the process. In contrast, if the result of authentication has failed (No at Step S106), the client terminal 10 ends the process without permitting the login.

The processes performed at Steps S102 and S103 illustrated in FIG. 15 is not always need to perform in the order illustrated in FIG. 15. For example, the order of the processes may also be interchanged with each other or may also be performed in parallel.

(2) Narrow Down Data Creating Process

Figure 16:
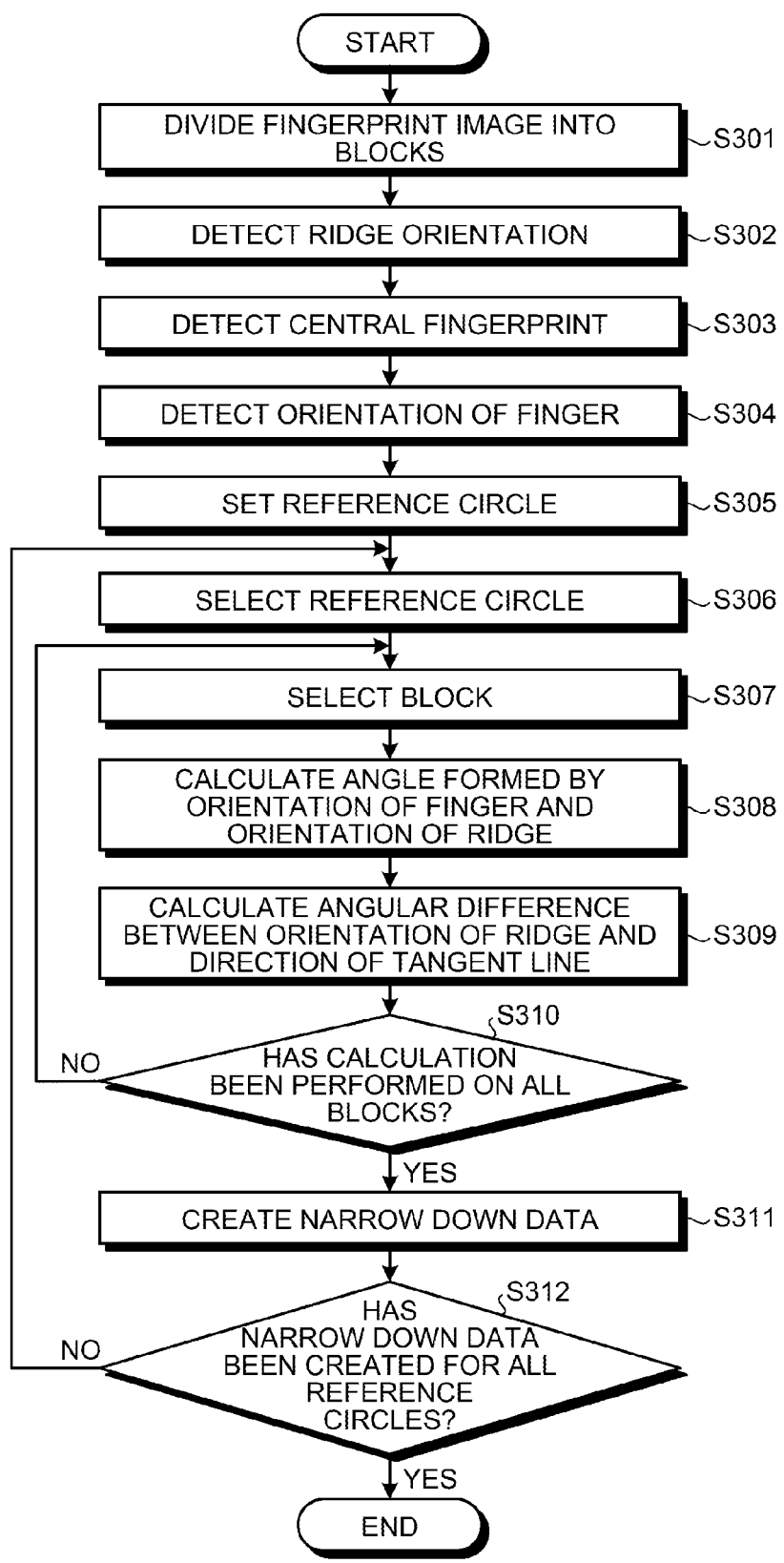
FIG. 16 is a flowchart illustrating the flow of a narrow down data creating process according to the first embodiment.

FIG. 16 is a flowchart illustrating the flow of a narrow down data creating process according to the first embodiment. This narrow down data creating process is a process that is associated with the process at Step S103 illustrated in FIG. 15 and that is started when matching data is created. Furthermore, the narrow down data creating process is not always need to perform after the process at Step S102. The narrow down data creating process may be performed at any time as long as it is performed after a fingerprint image has been acquired.

As illustrated in FIG. 16, first, the client terminal 10 divides a fingerprint image into blocks in a predetermined size (Step S301). Then, the client terminal 10 detects, for each block, the orientation of a ridge by performing edge detection on a boundary line between the ridge and a valley line (Step S302).

Subsequently, the client terminal 10 detects, from the fingerprint image, a singular point, such as a central fingerprint or a delta, of the pattern that forms the fingerprint (Step S303). Then, the client terminal 10 detects, from the fingerprint image, the orientation of the finger, such as the longitudinal direction of the finger, that includes the fingerprint (Step S304).

Then, the client terminal 10 sets, as the reference circle, multiple concentric circles that that have different radii and shares, as the central point, the position where the central fingerprint is located on the fingerprint image (Step S305). Subsequently, the client terminal 10 selects one reference circle from among the multiple reference circles (Step S306) and then selects a block that includes the circumference of the reference circle as the target for calculating an angle (Step S307).

Them, the client terminal 10 calculates an angle formed by the orientation of the finger detected at Step S304 and the orientation of the ridge in the block selected at Step S307 (Step S308). Then, the client terminal 10 obtains the direction of a tangent line passing through the intersection P of the reference circle and the ridge, which is obtained if it is assumed that the ridge in the block intersects with the reference circle, and then calculates an angular difference between the orientation of the ridge and the direction of the tangent line (Step S309).

Then, until angular differences are calculated for all of the blocks included in the circumference of the reference circle (No at Step S310), the client terminal 10 repeatedly performs the process at Steps S307 to S309.

Thereafter, when the angular differences have been calculated for all of the blocks included in the circumference of the reference circle (Yes at Step S310), the client terminal 10 creates narrow down data by associating the angular differences calculated at Step S309 with the positions on the circumference of the reference circle (Step S311).

Then, until narrow down data has been created for all of the reference circles (No at Step S312), the client terminal 10 repeatedly performs the processes at Steps S306 to S311. Thereafter, when narrow down data has been created for all of the reference circles (Yes at Step S312), the client terminal 10 ends the process.

(3) Biometric Authentication Process

Figure 17:
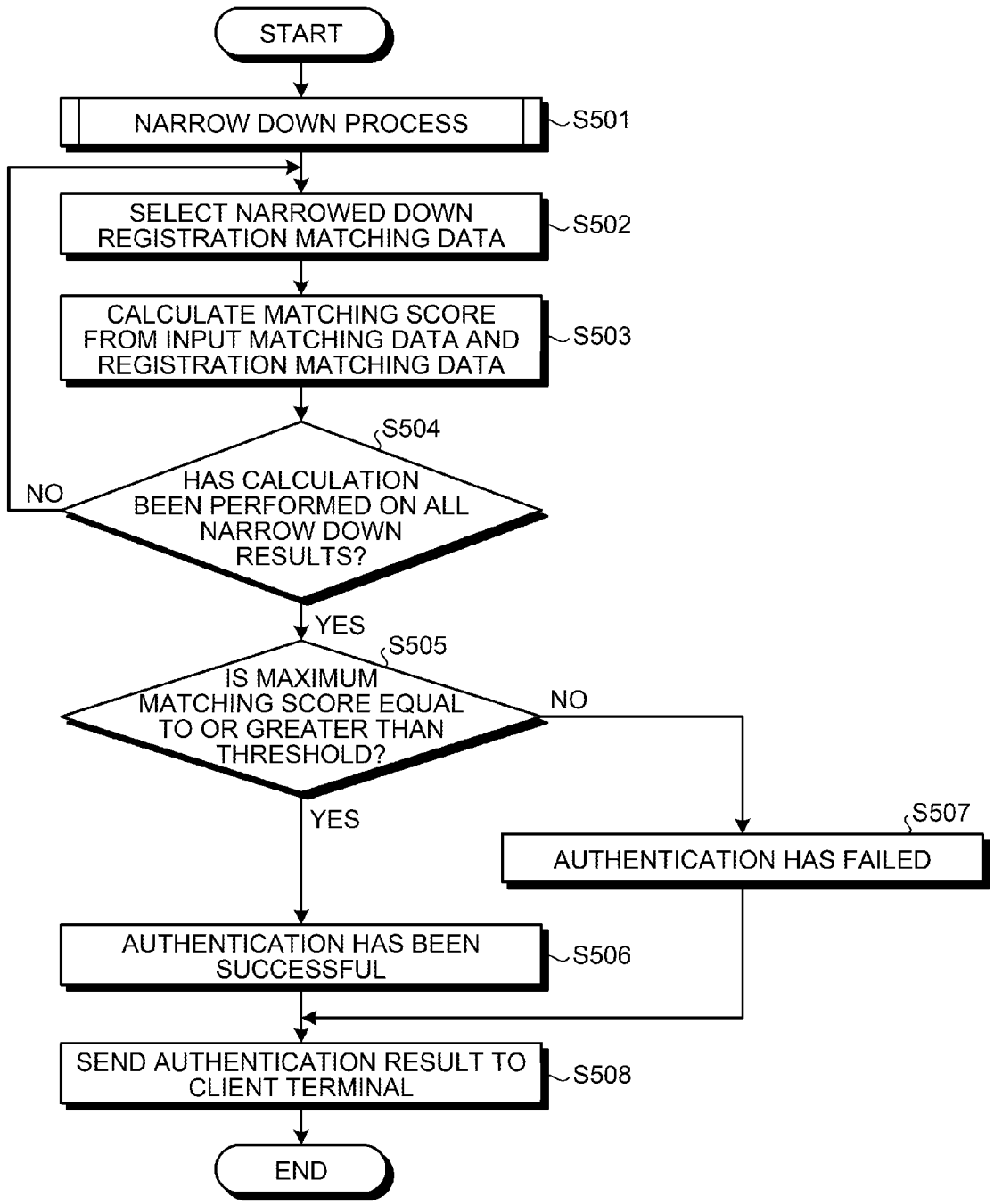
FIG. 17 is a flowchart illustrating the flow of a biometric authentication process according to the first embodiment.

FIG. 17 is a flowchart illustrating the flow of a biometric authentication process according to the first embodiment. This biometric authentication process is a process that is repeatedly performed when a power supply of the server device 30 is turned ON and that is started when authentication data that includes input matching data and input narrow down data is received from the client terminal 10.

As illustrated in FIG. 17, when the server device 30 receives authentication data from the client terminal 10, the server device 30 performs a narrow down process that narrows down registration matching data that is matched against input matching data from among pieces of registration matching data stored in the authentication data storing unit 32 (Step S501).

Then, the server device 30 selects a single piece of registration matching data that has been narrowed down at Step S501 (Step S502). Then, the server device 30 calculates a matching score between the input matching data and the registration matching data (Step S503).

Then, until matching scores related to all of the narrow down results are calculated (No at Step S504), the server device 30 repeatedly performs the process at Steps S502 to S503. Then, when the matching scores related to all of the narrow down results have been calculated (Yes at Step S504), the server device 30 determines whether, from among the matching scores calculated at Step S503, the maximum matching score is equal to or greater than a predetermined threshold (Step S505).

At this point, if the maximum matching score is equal to or greater than the threshold (Yes at Step S505), the server device 30 determines that fingerprint authentication has been successful between the input matching data and the registration matching data with the maximum matching score (Step S506). In contrast, if the maximum matching score is less than the threshold (No at Step S505), the server device 30 determines that the authentication of the input matching data has failed (Step S507). Then, the server device 30 sends the authentication result to the client terminal 10 (Step S508) and ends the process.

(4) Narrow Down Process

Figure 18:
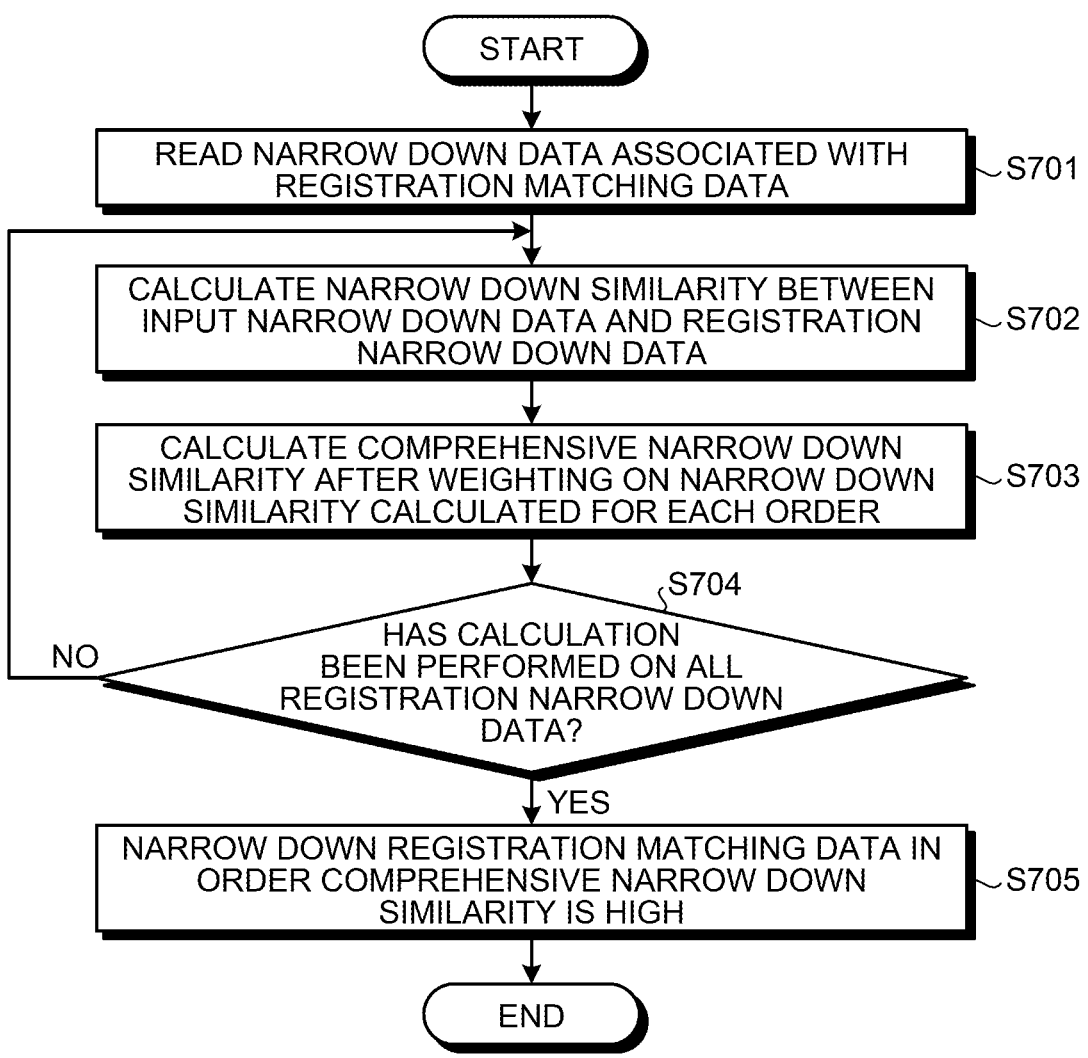
FIG. 18 is a flowchart illustrating the flow of a narrow down process according to the first embodiment.

FIG. 18 is a flowchart illustrating the flow of a narrow down process according to the first embodiment. This narrow down process is the process that is associated with the process at Step S501 illustrated in FIG. 17 and that is started when authentication data that includes input matching data and input narrow down data is received from the client terminal 10.

As illustrated in FIG. 18, the server device 30 reads registration narrow down data that is associated with registration matching data from the authentication data storing unit 32 (Step S701). Then, the server device 30 calculates, for each order of the reference circle, narrow down similarity between the registration narrow down data that has been read from the authentication data storing unit 32 and the input narrow down data that has been received from the client terminal (Step S702). Then, by weighting the narrow down similarity that is calculated for each order, the server device 30 calculates comprehensive narrow down similarity in which each order of the narrow down similarity has been updated (Step S703).

Then, until narrow down similarity for all pieces of registration narrow down data has been calculated (No at Step S704), the server device 30 repeatedly performs the processes at Steps S702 to S703.

If narrow down similarity for all pieces of the registration narrow down data has been calculated (Yes at Step S704), the server device 30 performs the following process. Namely, the server device 30 sorts the comprehensive narrow down similarity in descending order; narrows down registration matching data that is associated with the registration narrow down data that is within a predetermined ratio with respect to the total number N of registration matching data, e.g., within the top 10 of the total number N of registration matching data (Step S705); and then ends the process.

Advantage of the First Embodiment

As described above, the client terminal 10 according to the first embodiment obtains an angle formed by the orientation of a ridge on the circumference of a reference circle whose center is the position of the central fingerprint and the direction of a tangent line of the reference circle and then creates narrow down data that is associated with the position of the angle on the circumference. Consequently, because the client terminal 10 according to the first embodiment can create narrow down data as long as the client terminal 10 can obtain a fingerprint image of the central fingerprint and a position closer to the central fingerprint that a easily captured by the fingerprint sensor 20 when the fingerprint is input, the client terminal 10 can create narrow down data that is robust with respect to an input of the fingerprint. Accordingly, the client terminal 10 according to the first embodiment can make the accuracy of narrow down stable.

Furthermore, with the client terminal 10 according to the first embodiment, for the target to be subjected to the narrow down process when fingerprint authentication is performed, because only the angles that are sampled for each position on the circumference of the reference circle can be used for the target for the process, an amount of the process and the processing time can be reduced. Furthermore, because the client terminal 10 according to the first embodiment can create narrow down data that is obtained after alignment has been performed by using the central fingerprint, it is possible to eliminate complicated alignment, such as parallel translation or rotational transfer, when the narrow down process is performed at the time of fingerprint authentication.

[b] Second Embodiment

In the above explanation, a description thus far has been given of the embodiment according to the present invention; however, the embodiment is not limited thereto and can be implemented with various kinds of embodiments other than the embodiment described above. Therefore, another embodiment included in the present invention will be described below.

Authentication Environment

In the first embodiment described above, a description has been given of a case in which the system disclosed in the present invention is used for login authentication of a PC; however, the system is not limited thereto. For example, the system disclosed in the present invention may also widely used in an environment that uses biometric authentication, such as when a login of an application is subjected to biometric authentication, when biometric authentication is performed at the time of entering or leaving a room, when biometric authentication is performed on biometric information listed on a black list or a white list at the time of the immigration clearance, or the like.

Stand-alone

In the first embodiment described above, a description has been given of a case in which fingerprint authentication is performed in a client server system; however, the fingerprint authentication is not always need to perform in the system. For example, the functions performed by, for example, the narrow down data creating unit 12, the narrow down unit 33, and the authentication unit 34 may also be installed in a notebook personal computer (notebook PC) or a mobile phone and the fingerprint authentication may be performed by the notebook PC or the mobile phone as a stand-alone.

Separation and Integration

The components of each unit illustrated in the drawings are not always physically configured as illustrated in the drawings. In other words, the specific shape of a separate or integrated device is not limited to the drawings. Specifically, all or part of the device can be configured by functionally or physically separating or integrating any of the units depending on various loads or use conditions. For example, some functioning units included in the narrow down data creating unit 12 or the narrow down data creating unit 12 may also be connected, via a network, as an external device of the server device 30. Furthermore, some functioning unit included in the narrow down data creating unit 12 or the narrow down data creating unit 12 may also be included in another device, be connected via the network, and cooperate with each other, whereby implementing the function performed by the client terminal 10. Furthermore, the registering unit 31, the narrow down unit 33, or the authentication unit 34 may also be connected, via a network, as an external device of the server device 30. Furthermore, the registering unit 31, the narrow down unit 33, or the authentication unit 34 may also be includes in another device, be connected via a network, and cooperate with each other, whereby implementing the function performed by the server device 30.

According to an aspect of an embodiment of the narrow down data creating method disclosed in the present invention, an advantage is provided in that it is possible to stabilize narrow down accuracy.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A fingerprint authentication method comprising:
    acquiring, using a processor, an image that includes at least a part of a fingerprint;
    first detecting, using the processor, an orientation of a ridge that forms the fingerprint from the image;
    second detecting, using the processor, a singular point of the fingerprint from the image;
    calculating, using the processor, angles formed, on circumferences of a plurality of reference circles which concentric circles share the singular point as a center point, by the orientation of the ridge and the direction of a tangent line that comes into contact with the reference circle;
    creating, using the processor, narrow down data that is used to narrow down matching data that is used to match the fingerprint by associating the angle with positions on the circumferences of the plurality of reference circles;
    calculating, using the processor, a similarity from the narrow down data corresponding to the image and narrow down data corresponding to registration matching data registered by a computer;
    extracting, using the processor, the matching data from the registration matching data based on the similarity calculated at the calculating;
    weighting, using the processor, both of the narrow down data in accordance with radiuses of the concentric circles; and
    matching, using the processor, the image against the matching data extracted.

2. The fingerprint authentication method according to claim 1, further comprising:
    narrowing down, using another processor, the matching data that is used to match the fingerprint based on both of the narrow down data; and
    performing, using the another processor, authentication by matching input matching data against the narrowed down matching data.

3. The fingerprint authentication method according to claim 1, further comprising:
    narrowing down, using the processor, matching data that is used to match the fingerprint; and
    performing, using the processor, authentication by matching input matching data against the narrowed down matching data.

4. The fingerprint authentication method according to claim 1, further comprising
    third detecting, using the processor, an orientation of a finger that includes the fingerprint, wherein
    the calculating includes calculating, based on the orientation of the finger, the angle formed for a portion, on the circumference of the reference circle, of the finger on a root side.

5. The fingerprint authentication method according to claim 1, further comprising setting, using the processor, the radiuses of the reference circles, based on a width or an interval of the ridge.

6. The fingerprint authentication method according to claim 1, wherein the second detecting includes detecting a central position of the fingerprint from the image.

7. A fingerprint authentication device comprising:
    a memory, and
    a processor coupled to the memory, wherein the processor executes a process comprising:
    acquiring an image that includes at least a part of a fingerprint;
    first detecting an orientation of a ridge that forms the fingerprint from the image;
    second detecting a singular point of the fingerprint from the image;
    calculating angles formed, on circumferences of a plurality of reference circles which concentric circles share the singular point as a center point, by the orientation of the ridge and the direction of a tangent line that comes into contact with the reference circle;
    creating narrow down data that is used to narrow down matching data that is used to match the fingerprint by associating the angle with positions on the circumferences of the plurality of reference circles;
    calculating a similarity from the narrow down data corresponding to the image and narrow down data corresponding to registration matching data registered by the computer;

extracting the matching data from the registration matching data based on the similarity calculated at the calculating;

weighting both of the narrow down data in accordance with radiuses of the concentric circles; and matching the image against the matching data extracted.

8. The fingerprint authentication device according to claim 7, wherein the process further comprises third detecting an orientation of a finger that includes the fingerprint, wherein the calculating includes calculating, based on the orientation of the finger, the angle formed for a portion, on the circumference of the reference circle, of the finger on a root side.

9. The fingerprint authentication device according to claim 7, wherein the process further comprises setting, based on a width or an interval of the ridge, the radiuses of the reference circles.

10. The fingerprint authentication device according to claim 7, wherein the second detecting includes detecting a central position of the fingerprint from the image.

* * * * *